9019X
P. COPE.
No Printed Specification Available
Grinding and Chopping Grain.
Patented Aug. 17, 1835.
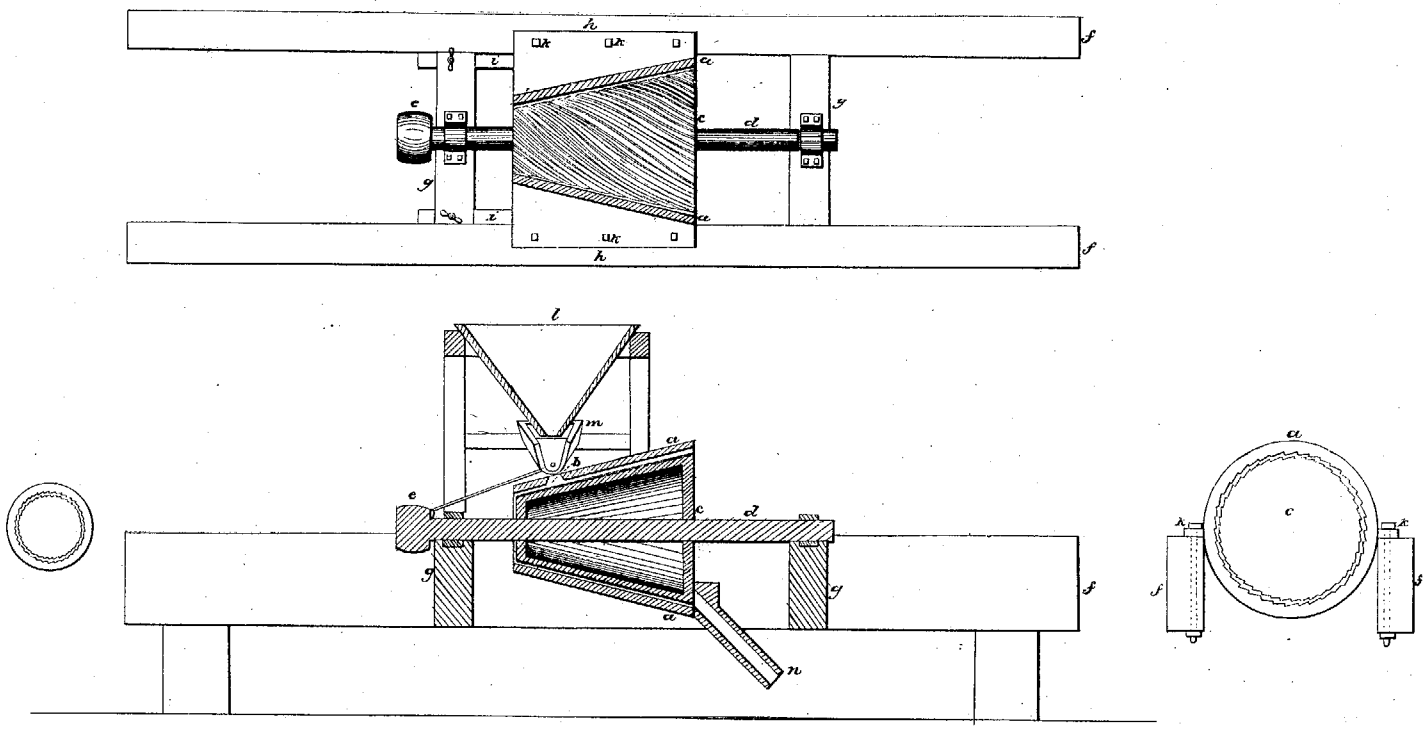
THE NORRIS PETERS CO., PHOTO-LITHO., WASHINGTON, D. C.

[illegible]

Aug. 17. 1835 579.

9019X

Pierson Cope, of Washington Township, (Pennsylvania)

Letters Patent.

The schedule referred to in these Letters Patent and making
part of the same, containing a description in the words of the said
Pierson Cope himself of his improvement in grinding and chopping
of Grain. To all to whom these presents shall come Be it known that I, Pierson Cope, of the Township of
Washington and County of Fayette and State of Pennsylvania, have
invented _ new and useful machine or improvement in choping of
Rye, Corn, and Oats, or even in grinding any kind of grain common
to be ground, and that the following is a full & exact description of
the construction and operation of the said Machine as invented by me.

This rotary choping machine runs verry lite, the pow
er of one horse is sufficient to run it so as to chop eight bushels per
hour, and will grind wheat past all expectation and faster than
most comonon mills, It consists of a cast iron cylinder or concave
which is fourteen inches in length, the insides are made verry true and
is five inches in diameter, att the one end & twelve inches at the other
End, the inside of this cylinder is furrowed from the small end
to the other, running from the right angles of about thirty degrees and
are about half inch space at the small end and increases in space
so as to make the same number, at the other, they are cut as saw
teeth are, and at the small end about one twelfth of an inch deep and
verry shallow at the other, This cylinder is laid horizontal so as to
make the diameters of each end level The cylinder is three fourths of an
inch thick, there is one wing cast in on each side of the cylinder, the
upper side of which is precisely in the center one half inch thick being
wider at the small end making it square to rest on the timbers
Three inches from the small end on the top of the cylinder is an
inlet that receives the grain, and from that to the right in the inner Drawing Made 720. 9019X part of the cylinder is wider one fourth round that it may feed freely,
The runner is made to fit the concave on the inside of the cylinder,
This runner, is furrowd as is stated above, the spaces agreeing only that
they incline to the left so as when they pass each other they will grind
and clean themselves most bautifully, it being cast iron with each end
cast solid except a two inch square mortice in each end, to receive an
iron axil which extends ten inches at each end past the casting one end
turned so as to fit a cast iron seat; the other end, where the grain feeds
in, is a neck turned having three inches at the end for a pulley or cogs so
as to suit convenience, The before mentioned part is a particular part
of the invention, it is small and portable the advantage of attaching it to
the horse power of a thrashing machine so as to suit farmers, or stillers as
the case may be, The form of the frame is of hewn or sawn timber
seven by three inches, the side timbers is six feet long. the width
just so as to suit casting or the wings of the casting, so that it will lay one
inch and half on each side of the frame the crost timbers just so wide
as will suit the seats of the axil to run in, on the side timbers where
the wings of the cylinder rests there is an iron bar one on each side
with shoulders to keep it permanent they run back the crost timber
where there is a screw that screws in the crost timber to set the grind
-ing finer or coarser. The height of the frame may be to suit con
venience the cylinder fastens down with iron bolts through the
side beams with burs to slacken when tempering the grinding,
On the frame above the cylinder, there is a small frame suitable
for the hopper and shoe to rest on it is similar to other mills the
shoe is put in motion by an iron from it to the pulley, There is a
curb at the large end of cylinder where the meal discharges through
a spout below,
What I claim as my own invention and not previously
known in the above described machine, is the plan of the casting
the plan of the furrows that they may grind fast with little power
and discharge freely through to the oposite end and the tempering
screws with the iron sliders and putting it together for convenience Exd. W.G.L.

Witnesses. Thomas Shepherd
Aug. L. Strann [illegible]
James Fuller

Pierson Hope

[960 [illegible]]